United States Patent [19]
Gutwerk

[11] Patent Number: 5,818,382
[45] Date of Patent: Oct. 6, 1998

[54] LONG RANGE RF TAG

[75] Inventor: Martin A. Gutwerk, McKeesport, Pa.

[73] Assignees: Herman David Palmieri; Thomas A. Charles, both of Pittsburgh, Pa.

[21] Appl. No.: 579,964

[22] Filed: Dec. 28, 1995

Related U.S. Application Data

[63] Continuation-in-part of Ser. No. 253,685, Jun. 3, 1994, Pat. No. 5,481,478.

[51] Int. Cl.$^6$ .............................. G01S 13/78; G01S 13/08
[52] U.S. Cl. ................................. 342/46; 342/51
[58] Field of Search ............................... 342/51, 457, 42, 342/46; 340/825.34, 825.54

[56] References Cited

U.S. PATENT DOCUMENTS

| | | | |
|---|---|---|---|
| 4,068,232 | 1/1978 | Meyers et al. | 342/42 |
| 5,517,188 | 5/1996 | Carroll et al. | 340/825.54 |
| 5,521,590 | 5/1996 | Hanaoka et al. | 340/825.54 |

Primary Examiner—Gregory C. Issing
Attorney, Agent, or Firm—Clifford A. Poff

[57] ABSTRACT

A long range identification system is disclosed for utilizing a radio frequency (RF) signal sent by a calling location, such as a mass transit vehicle, as the energy source to power response apparatus at a responding location, such as a route stop of the transit vehicle. The responding signal is then broadcast within the transit vehicle as audio or as a video display of a signal from a character generator, or as both audio and video. The long range identification system includes a RF transmitter at the calling location, a receiver at the responding location for receiving the signal and passively generating RF voltage in response to a particular RF signal of a predetermined frequency, a rectifier, capacitors connected to the rectifier to store charge, a voltage regulator connected to the capacitors and operating when a sufficient charge has developed in the capacitors, a digital code generator identifying the responding location, a transmitter for broadcasting a signal carrying the identifying code, and a receiver and decoder located at the calling location, or elsewhere.

24 Claims, 11 Drawing Sheets

LONG RANGE RF TAG

CROSS REFERENCED TO RELATED APPLICATION

This patent application is a continuation-in-part of application Ser. No. 08/253,685, filed Jun. 3, 1994, now U.S. Pat. No. 5,481,478.

BACKGROUND OF THE INVENTION

1. Field of the Invention

The present invention relates to a long range radio frequency (RF) tag for identifying a location in response to a signal sent from a calling location. More particularly, the present invention relates to such a system wherein the RF signal sent from the calling location, such as a mass transit vehicle, is used at the responding location, such as a route stop, as the energy source to power the RF response to the calling location.

2. Description of the Prior Art

Currently, there are transit systems wherein a transit vehicle approaching a scheduled stop recognizes the stop and annunciates information regarding the stop to the vehicle passengers and wherein information regarding the approaching vehicle is annunciated locally at the stop. While not so limited, the present invention is particularly useful for use in mass transit systems where a RF signal sent from the transit vehicle is used as the energy source at the transit stop to power the apparatus which generates a responding signal to identify the stop to the transit vehicle. This has the advantage of freeing the responding apparatus from having to provide its own power supply, thereby eliminating maintenance that would be required to ensure power supply either from battery power or from connection to a supply line and without reliance on solar energy.

Accordingly, it is an object of the present invention to provide a long range RF tag wherein a RF signal sent by a calling location is used as the energy source to power apparatus at a responding location for responding to the RF signal.

SUMMARY OF THE INVENTION

The present invention provides a long range radio frequency (RF) tag for identifying a responding location, such as a route stop of a mass transit system, utilizing a RF signal sent by a calling location, such as a transit vehicle, to store energy at the responding location to power a response to the calling location.

According to the present invention there is found a long range radio frequency (RF) tag for identifying a responding location, the tag including a transmitter for producing a radio frequency signal at a calling location, receiver means at the responding location responsive to the radio frequency signal for passively generating an alternating current voltage, rectifying means responsive to the voltage, the rectifying means forming a tag transmitter power supply, encoding means for generating a preset digital code identifying the responding location, a tag transmitter receiving the preset digital code for broadcasting an encoded radio frequency signal, a voltage regulator for supplying an operating voltage from the tag transmitter power supply to the encoding means and the tag transmitter, the voltage regulator being operative in response to a predetermined voltage established by the rectifying means, and means responsive to the encoded radio frequency signal for receiving and decoding the encoded radio frequency signal.

BRIEF DESCRIPTION OF THE DRAWINGS

The present invention will be more fully understood when the following description is read in light of the accompanying drawings in which.

DETAILED DESCRIPTION OF THE DRAWINGS

Figure 1:
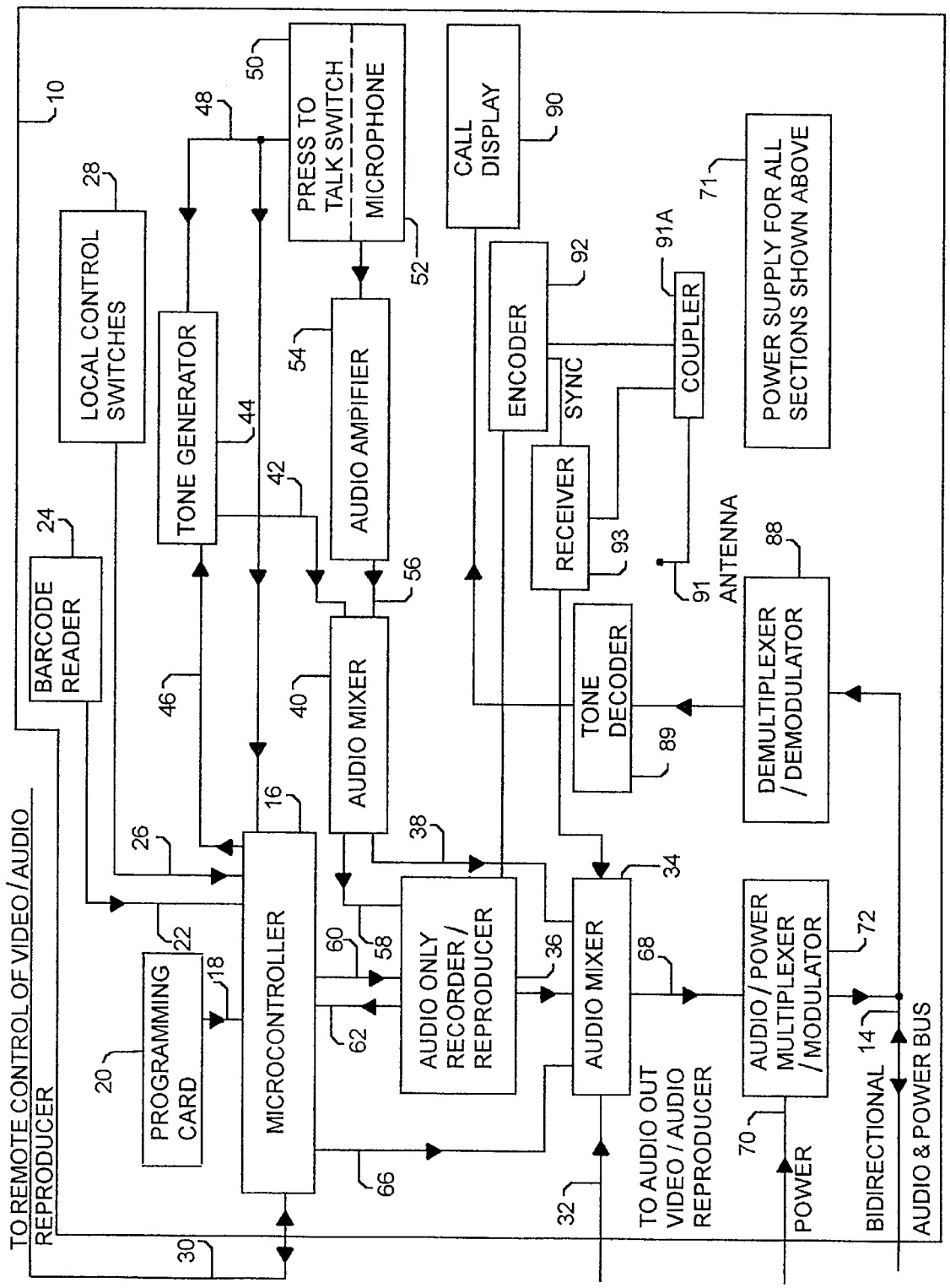
FIG. 1 is a block diagram of a broadcast system for broadcasting audio in a mass transit vehicle.
Figure 2:
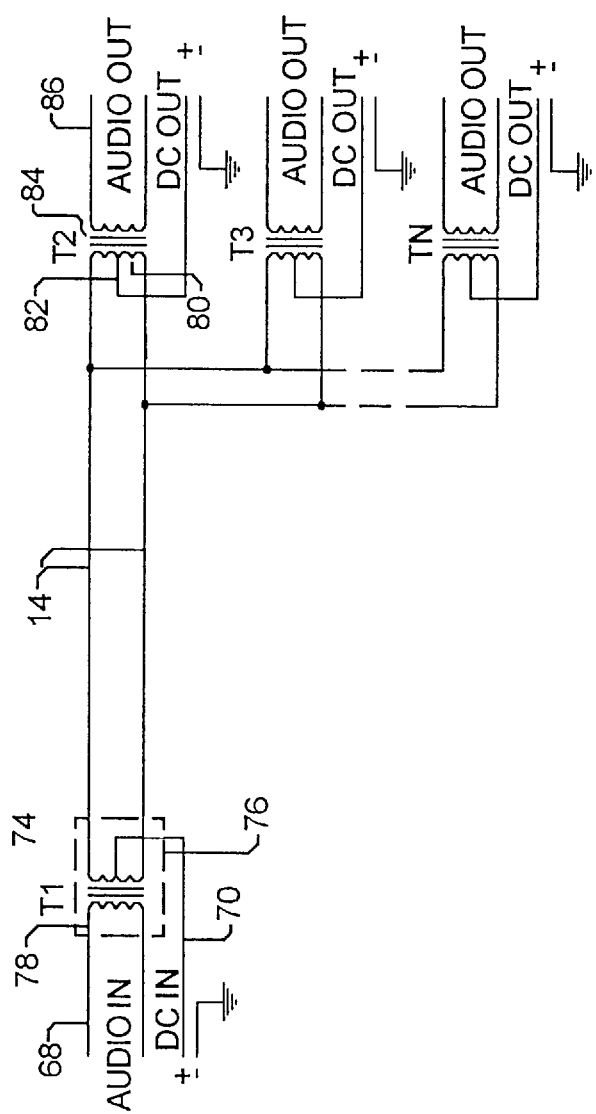
FIG. 2 is an electrical diagram to illustrate encoding and decoding of an audio signal on an impressed DC voltage and recovery in the broadcast system of FIG. 1.
Figure 3:
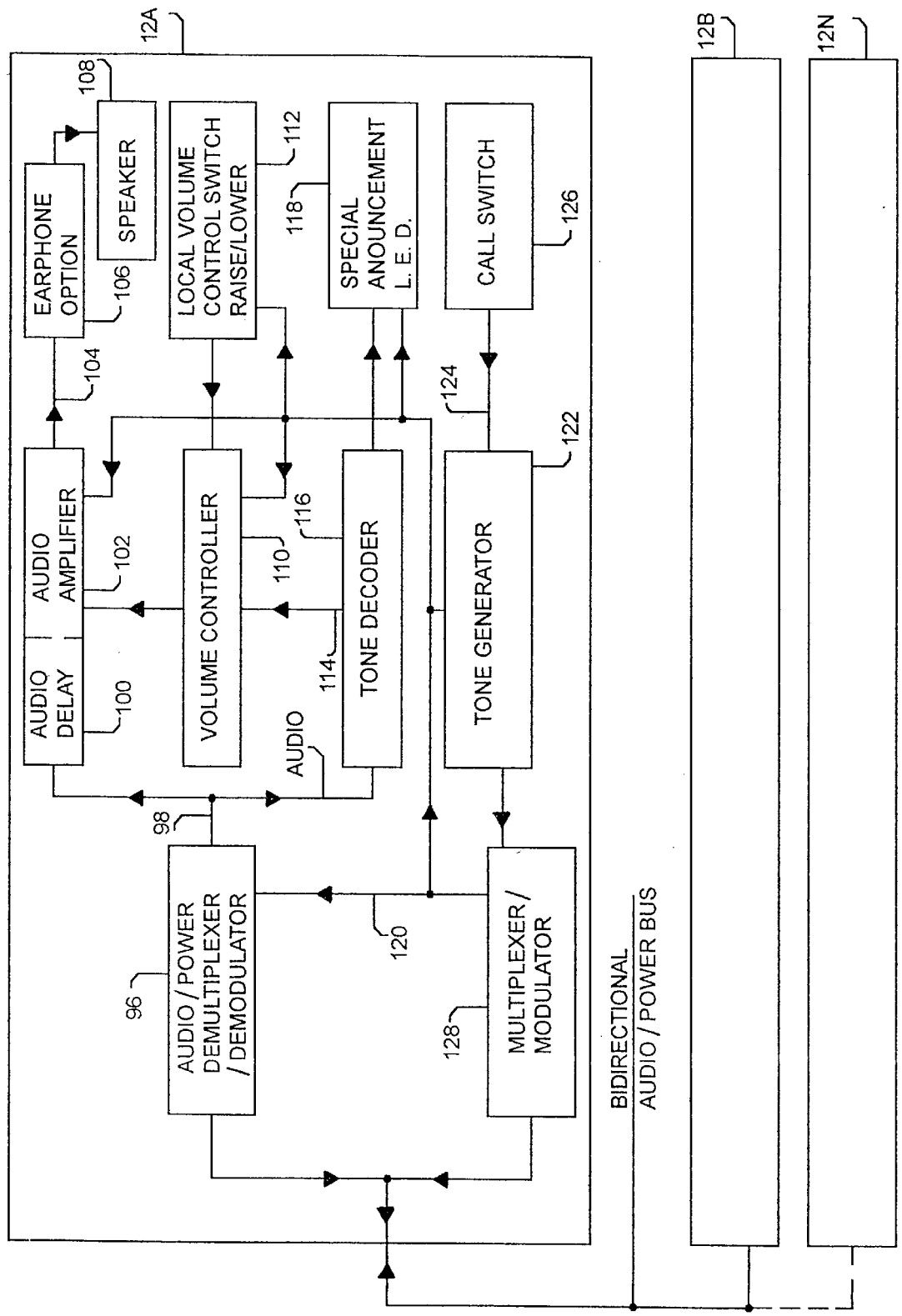
FIG. 3 is a block diagram illustrating the components of monitors forming part of the broadcast system shown in FIG. 1.

In FIGS. 1–3 there is shown a broadcast system made up of a transmitter circuit 10 shown in FIG. 1 and a plurality discrete monitors 12-A, 12-B . . . 12N shown in FIG. 3 that are dedicated to individuals in a facility to receive an audio broadcast by the transmitter circuit 10. If desired, the audio portion of a video broadcast generally displayed in the facility may be distributed by the transmitter circuit 10 as part of the audio broadcast. The circuit 10 produces a composite audio signal on a bus 14 that extends throughout the facility, which may take the form of a mass transit vehicle. A suitable battery facility, not shown, is provided to insure operation of a period of time should there occur a power failure. As used herein, the term bus designates any of various ways of distributing an electrical signal throughout a facility and includes a coaxial cable, two twisted wires and the use of existing wiring within the facility. The signal supplied to the bus 14 supplies not only programming material that is reproduced at the various monitoring stations 12A, 12B . . . 12N but also a power supply for operation of the circuitry at each monitoring station.

The derivation of the audio portion of the signal applied to bus line 14 is in response to the control functions of a microcontroller 16. The microcontroller receives a plurality of input control signals which include a signal appearing on line 18 from a reader for a programming card 20 and/or a signal appearing on line 22 from a barcode reader 24 and/or a signal appearing on line 26 as the output of switches 28 under local control by an operator suitably situated at a control console of the mass transit vehicle. The outputs from programming card reader 20, bar code reader 24 and local control switches 28 all form programming signals for the microcontroller 16. Programming may readily be provided with selections of the various advertisements, announcements and entertainment time segments. The programming on the transit vehicle includes the use of the programming card 20 or an instruction sheet containing a bar code for barcode reader 24.

The microcontroller is connected by a line 30 which exercises control of a video/audio reproducer whose output, as a result thereof, is an video/audio signal of which the audio portion appears on line 32 supplied to a switched line 66 in an audio mixer 34. The audio signals applied to audio mixer 34 include the audio output from an audio recorder/audio reproducer 36 and an executive control signal appearing in line 38 as the output of an audio mixer 40. The audio mixer 40 has two input lines, one input line 42 extends to a tone generator 44 which is triggered to generate a tone alert signal in response to a signal appearing on line 46 which is an output control function of the microcontroller 16 responsive to a signal appearing on line 48 as an output signal of a switch 50 comprising a component of an announcement microphone 52. Switch 50 is a "push to talk" switch so that when the switch is depressed an activation signal appears on line 48 for energizing the tone generator 44. An audio signal appears at the output of the microphone transducer forming part of the announcement microphone 52 is applied to an audio amplifier 54 whose output on line 56 forms the second input to audio mixer 40. Thus, audio mixer 40 will receive initially a tone generator signal triggered by the "press to talk" switch and thereafter an audio signal via the microphone transducer and audio amplifier 54. These sequentially occurring signals fed to the audio mixer 40 are applied by line 38 to audio mixer 34 and by a line 58. These signals become a control basis for the operation of an audio recorder/reproducer 36. The recorder 36 is inhibited when a signal appears at the in line 58 and in the absence of the signal by line 58, audio recorder/reproducer 36 responds to controls provided by an output in line 60 from microcontroller 16.

A feedback line 62 provides status information of the audio recorder/reproducer 36 to the microcontroller 16. The microcontroller 16 has an output applied by line 66 to audio mixer 34. The output of mixer 34 is applied by line 68 for multiplexing with a power supply appearing on line 70 as the output of a power supply 71 in a multiplexer/modulator 72.

The power supply 71 includes a primary supply of direct current such as the electric system of the transit vehicle of a battery powered supply that continuously monitors for failure of the primary supply and automatically applies the battery back up when needed. An example of the circuitry suitable to form the audio/power multiplexer is shown in FIG. 2. The power output in line 70 is applied to the center tap of the secondary winding 74 of a transformer 76 whose end taps of the secondary winding are modulated outputs applied to bus 14. The primary coil 78 of transformer 76 is coupled to line 68 through suitable circuitry. FIG. 2 also illustrates the recovery of the audio signal and the DC power supply at each of monitoring stations throughout the facility. The details of the construction of the monitor of each station will be described in greater detail hereinafter. The recovery of the audio signal and DC power supply occurs by applying leads by the bus 14 to a transformer winding 80 having a center tap 82 which forms a DC output terminal. Winding 82 forms part of a transformer 84 having a second winding 86 whose output terminals form an audio output. Transformer 84 will be utilized at each monitor station as just described.

The bus 14 carries the output signal from the multiplexer/modulator 72 throughout the facility and also forms a feedback path for locally generated signals at any of the monitoring stations. The feedback signal, for example, may be an alarm to signal that a rider desires to exit the bus at the next designated stop. As shown in FIG. 1, such an alarm is applied by the bus 14 to a demultiplexer/demodulator 88 whose output is applied to a tone decoder 89 to generate an alarm signal in line extending to a call display 90. The system shown in FIG. 1, is expanded to include the transmission and reception of radio frequency signals via antenna 91.

Figure 9:
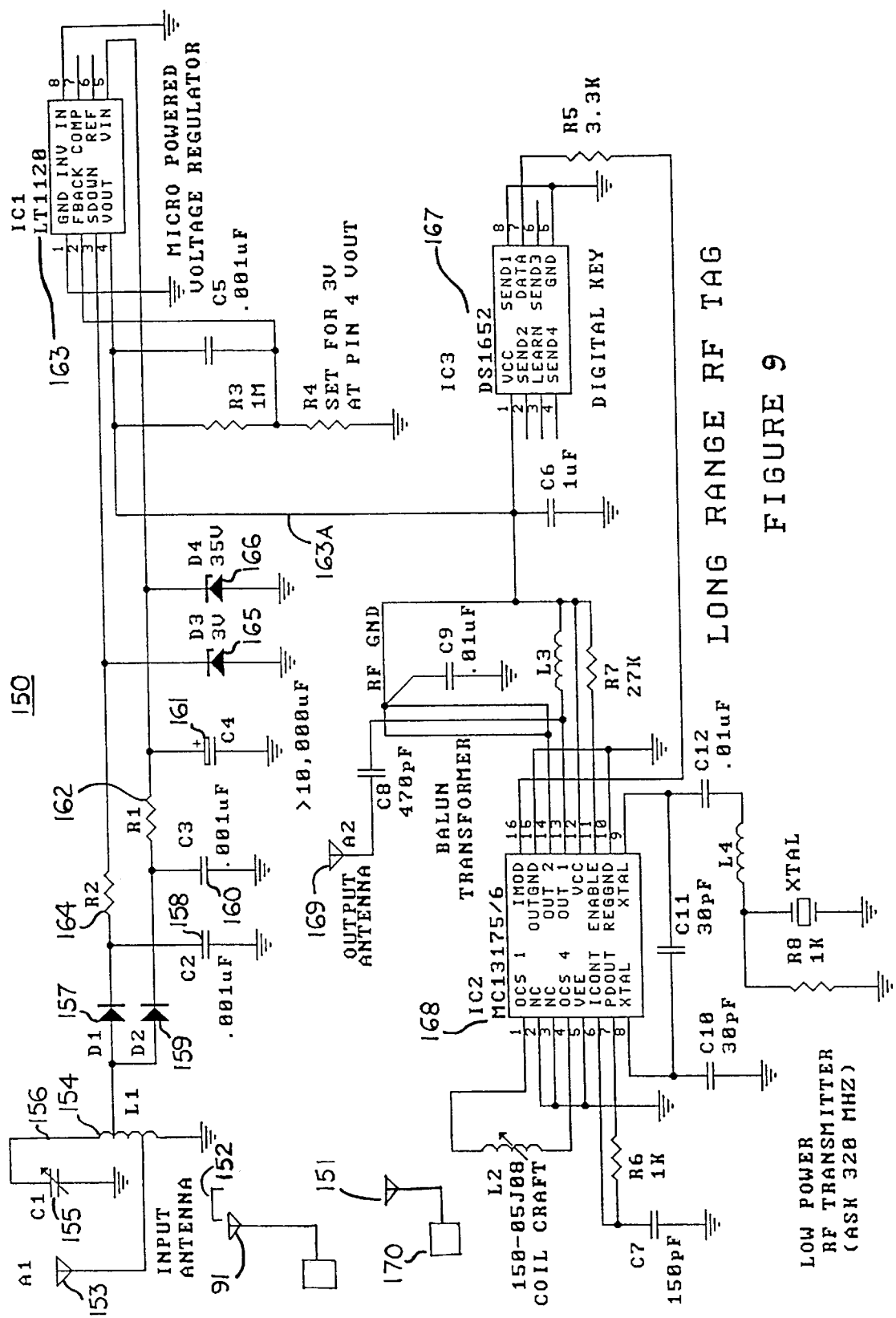
FIG. 9 is an electrical diagram illustrating a first embodiment of a long range RF tag according to the present invention.

Shown in FIG. 9 is an electrical schematic illustration of a first embodiment of a long range radio frequency (RF) tag 150 according to the present invention. A polling transmitter 151 at a calling location, a mass transit vehicle in the preferred embodiment, generates and transmits a high power continuous wave (CW) radio frequency (RF) signal 152 via antenna 91. The CW signal has a pulse lasting for 1 or 2 seconds duration having approximately 50 to 100 watts of power. The pulse will be cyclically transmitted as a single pulse, or if desired, as a train of pulses. The pulse cycle will be chosen to meet the requirements for polling of successive tags along a route, or to meet the requirements of the communication system. The long range RF tag will have a range on the order of approximately 100 feet or more, in contrast to a short range RF tag which will operate in a range from approximately 6 to 10 feet. The range may be extended beyond 100 feet by increasing the power in a proportional relation, and by the use of antennas having directivity and/or gain. At a responding location, the RF signal 152 is received by antenna 153. Inductor 154 and capacitor 155 together form input tuned filter 156. The inductor 154 is tapped so that the filter 156 is tuned to respond to a particular signal 152 from polling transmitter 151, the filter 156, in turn, passively generates a RF voltage corresponding to the RF signal received by antenna 153. Diode 157 serves to produce a direct voltage potential to charge capacitor 158, which operates as a detector. Diode 159 rectifies voltage to supply capacitors 160 and 161, which form the main rectified storage. The capacity of rectified storage capacitor 161, greatly exceeds that of detector capacitor 158. Resistor 162 is used to limit the minimum impedance which is seen by the tuned filter 156. Detector capacitor 158 will be charged relatively quickly and will supply voltage via resistor 164 to the voltage regulator 163, such as Linear Technology's Model LT1120 Micropower Regulator, to keep the regulator in a shut down mode and provide the larger rectified storage capacitor 161 with sufficient time to become charged. When a signal 152 ceases to be received by antenna 153 and tuned filter 156, detector capacitor 158 will discharge quickly, thereby removing the shut down command being provided by detector capacitor 158 to regulator 163. At this point, regulator 163 taking charge from rectified storage capacitor 161, becomes operative.

The presence of diodes 165 and 166 in the system serve to protect against an over voltage. The voltage regulator 163 controls and supplies voltage via line 163A to power a digital code generator 167, such as Dallas Semiconductor's Model DS1652 Key Match Memory System, and a low power RF transmitter 168, such as Motorola's Model MC13175/6 UHF FM/AM transmitter. The digital code generator 167 will repeatedly send a preselected digital code to transmitter 168. Transmitter 168, in turn, will broadcast a RF signal, which is an amplitude shift key (ASK) digital signal in the case of Motorola MC 13175/6, the transmitted RF signal carrying the digital code supplied by code generator 167 via antenna 169. The transmitter 168 is capable of generating a signal of up to 10 dBm, which is capable of carrying the responding signal a distance of approximately 0.25 miles. The encoded signal supplied by transmitter 168 is then picked up by a decoder receiver 170 which may, but need not, be located at the sending location. In the preferred embodiment, the signal of transmitter 168 is picked up on the transit vehicle through antenna 91 and coupler 91A and then supplied to receiver 93 for decoding and supplying a corresponding signal to audio mixer 34 and thereby distribution throughout the system for announcement in the audio system. In a similar fashion, referring to FIG. 1, the driver may send an encoded signal identifying the transit vehicle via encoder 92 and coupler 91A for broadcast via antenna 91. This information may then be received and decoded at a designated station along the route of the transit vehicle to be annunciated locally.

Figure 9A:
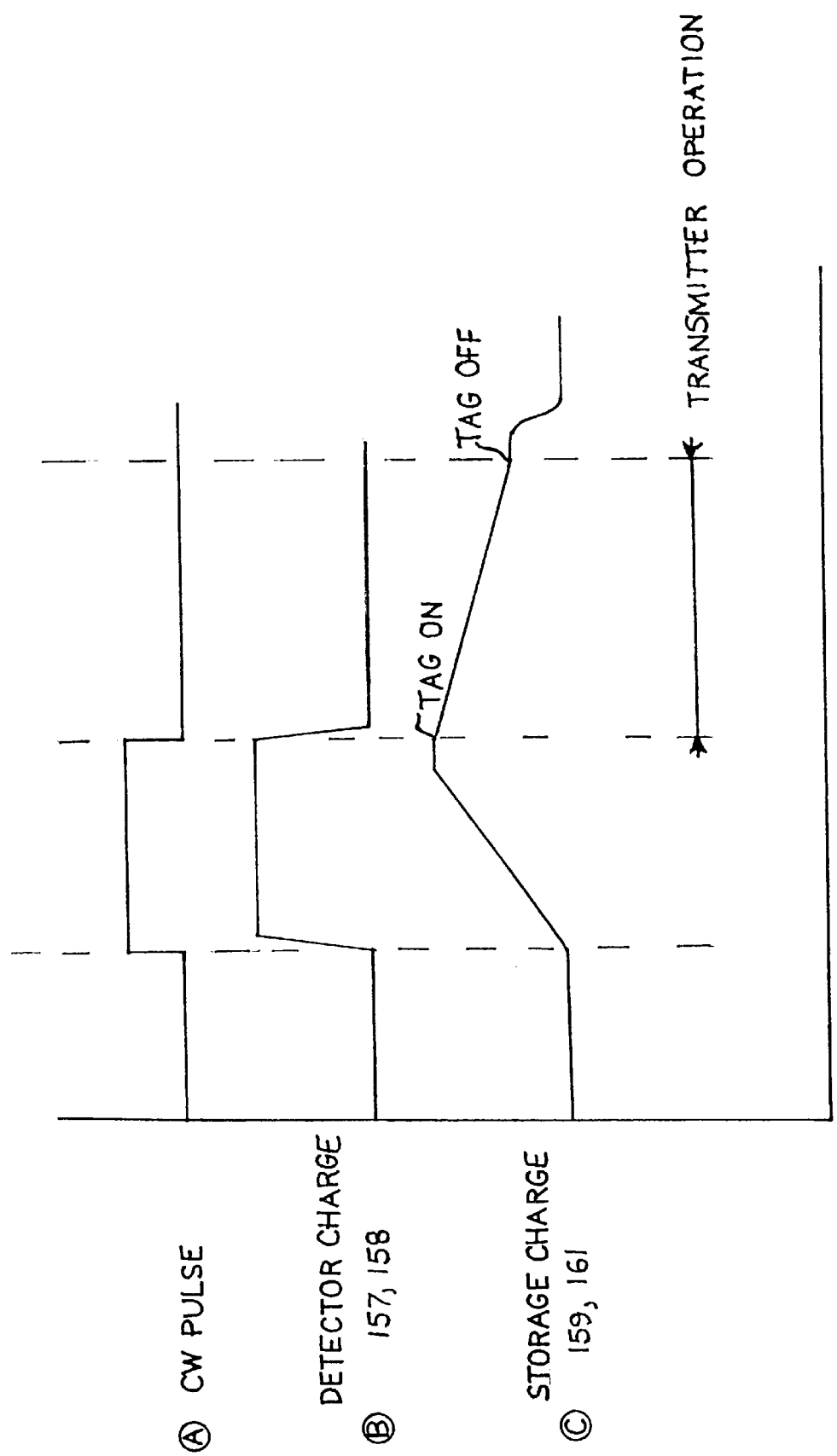
FIG. 9A is a graph showing a typical interaction of various parts of the RF tag on a time basis.

In FIG. 9A, there is shown a graphical comparison of a typical polling transmitter pulse, the charge in detector capacitor 158, and the charge in the rectified storage capacitor 161, versus time, to illustrate the interaction of some of the RF tag components of FIG. 9. In FIG. 9A, waveform A represents a CW signal having a pulse lasting from 1 to 2 seconds. Below this, it is seen from waveform B that the charge in the detector capacitor 158 reaches its maximum value rapidly near the beginning of the CW pulse and remains constant until the end of the pulse at which time the detector capacitor discharges rapidly. In contrast, as can be seen from waveform C, the charge in the rectified storage capacitor 161 reaches its maximum value more slowly during the CW pulse. At the end of the CW pulse, the storage value begins to drop as the regulator draws charge from the storage capacitor 161 to power the responding transmitter 168. When the storage value in capacitor 161 is reduced to some level, the responding transmitter 168 will be shut down as shown by the slight fluctuation in the downward ramp of the discharging storage capacitor 161.

Figure 10:
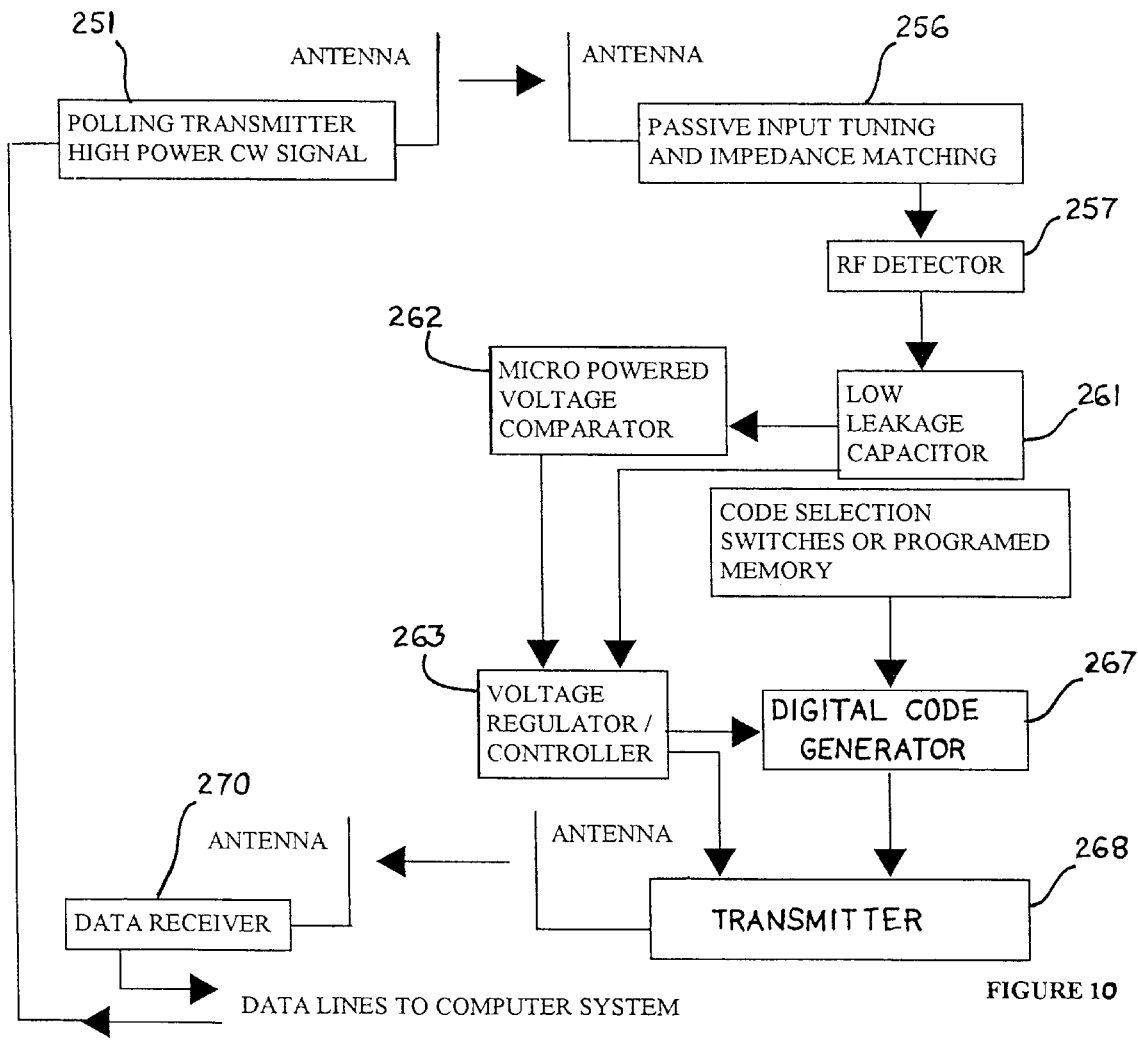
FIG. 10 is a block diagram illustrating a second embodiment of a long range RF tag according to the present invention utilizing a voltage comparator to control the operation of the voltage regulator.

In FIG. 10, a block diagram of a second embodiment of a long range RF identification system according to the present invention is shown. The second embodiment shares similar features of the first embodiment including polling transmitter 251, input tuner 256, voltage regulator 263, digital code generator 267 responding RF transmitter 268, and data receiver 270. An optional feature may include duplexers which will allow for the use of single antennas for sending and receiving signals at the calling location or at the responding location. In the second embodiment, RF detector 257 rectifies AC voltage which is passively generated by the input tuner 256 to DC voltage so that capacitor 261 may be charged. A voltage comparator 262 monitors the charge stored in capacitor 261 and after a predetermined charge is obtained, or alternatively, at the end of signal from transmitter 251, comparator 262 activates regulator 263, which then operates in the same fashion as the regulator of the first embodiment. The functions of both regulator and comparator may be provided by an individual component, such as Linear Technology's Model LT1120 Micropower Regulator which includes a comparator function.

FIG. 3 illustrates the circuitry for one of the plurality of monitoring stations 12A, 12B . . . 12N. The monitoring stations are identically constructed and include, as noted above in regard to FIG. 2, transformer 84 which forms part of an audio/power demultiplexer/demodulator 96 having an audio output line 98 connected through an audio delay 100 circuit in an audio amplifier 102. The amplifier applies an output signal to line 104 having an optional earphone jack 106 and a speaker 108. Amplifier 102 is driven in response to the volume controller 110 which is responsive to a local volume control switch 112 and an executive output signal generated within the volume controller 110 in response to a signal appearing on line 114 comprising the output of a tone decoder 116 having an input connected to the audio signal on output line 98. The volume controller when responding to the signal on line 114 establishes a predetermined volume level for the operation of an audio amplifier 102 which forms an executive volume control that follows preempting of programmed material by an executive tone alert signal which is the decoded output of tone decoder 116. When triggered, the output from the tone decoder 116 is applied to a signaling device such as an announcement LED 118 visible from the face of the monitoring station. A resident power supply is formed by a power supply output line 120 extending from the audio/power demultiplexer/demodulator 96. Power supply line 120 delivers the necessary operating current through operating amplifier 102, volume controller 110, local volume control 112, the announcement LED 118, tone decoder 116 and to a tone generator 122 which is triggered by the signal on line 124 from a pulse switch 126. The tone generator supplies an output signal to a multiplexer/modulator 128 which also receives a power supply by a branch of line 120. The output from the multiplexer/modulator is connected to the bus 14 to form a feedback path to the demodulator/demultiplexer 88, shown in FIG. 1 and described hereinbefore.

Figure 4:
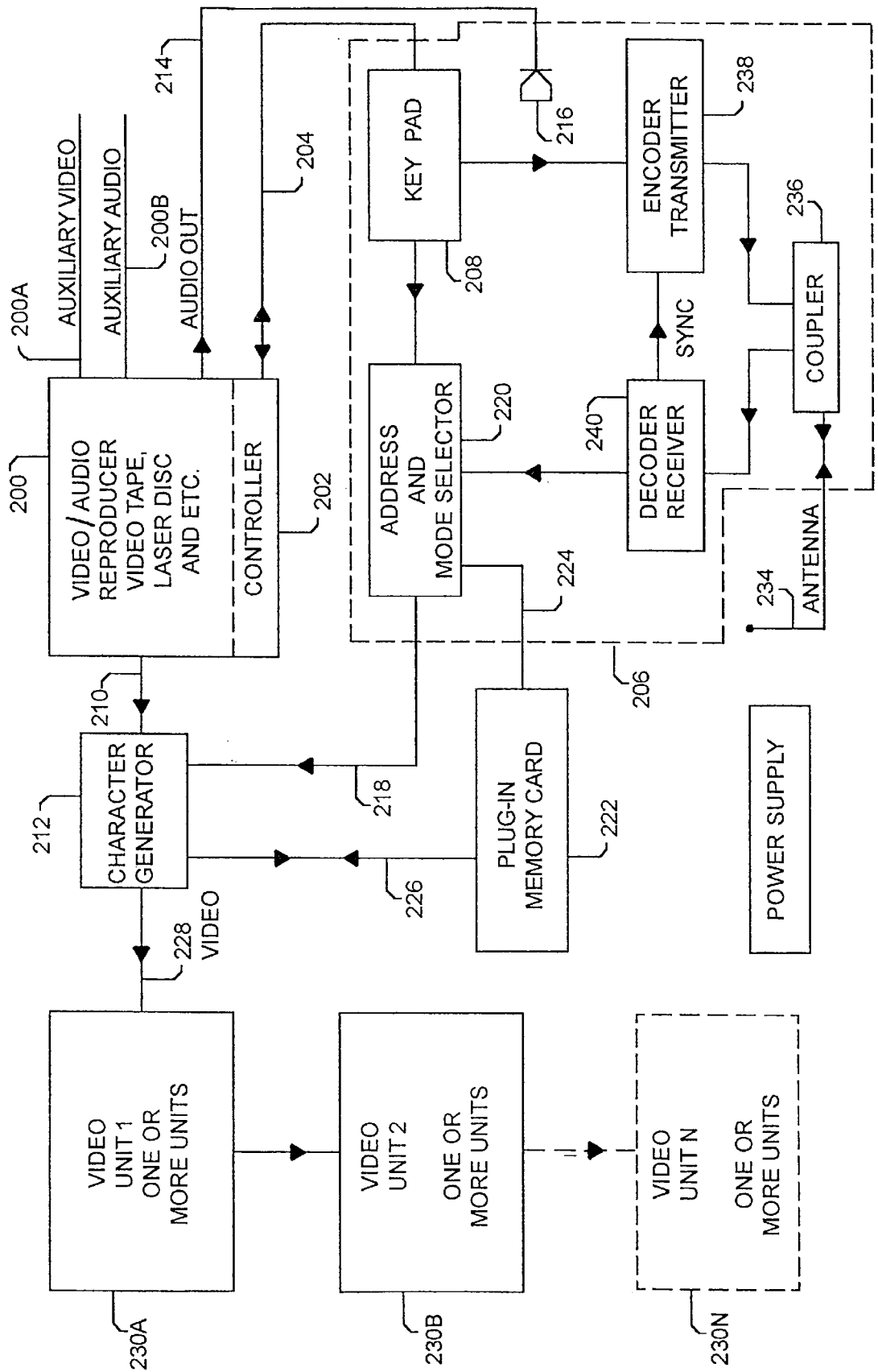
FIG. 4 is a block diagram of components forming a broadcast system for broadcasting video for general designation in conjunction with discrete audio to persons in the facility.
Figure 5:
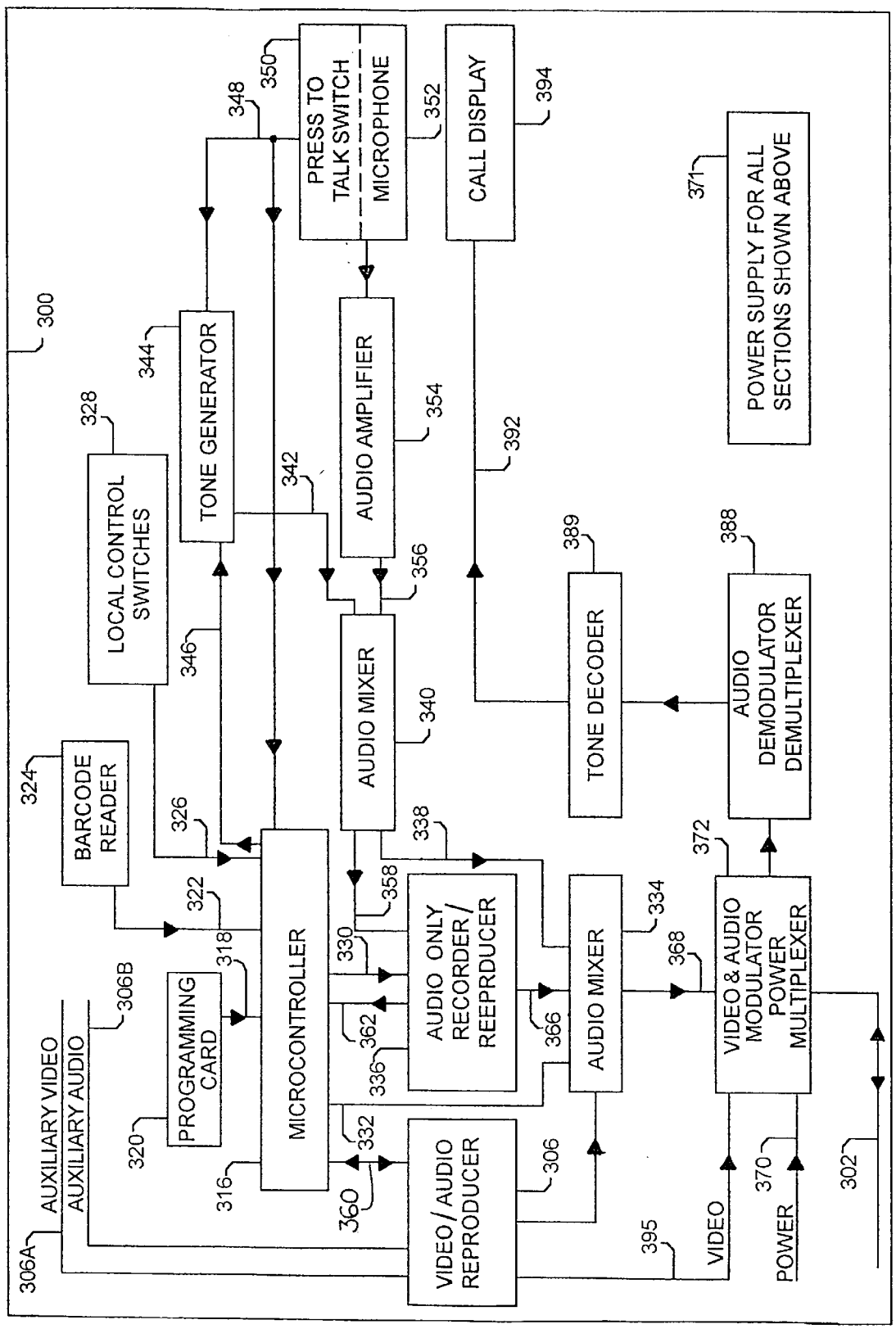
FIG. 5 is a block diagram of a broadcast system particularly useful for broadcasting a combination of audio and video signals using a conductor bus throughout a mass transit vehicle.

In the broadcast system shown in FIG. 4, there is added to the system video stations spaced about the facility for shared use by a number of persons in conjunction with a plurality of speaker boxes. The transmitter of FIGS. 1–3 is including as part of a reproducer 200 for audio/video signals which can be derived from storage medium such as a magnetic tape, a laser disk, and the like. The reproducer 200, as shown, includes input terminals 200A and 200B for receiving video and audio input signals, respectively, from any of diverse sources.

The reproducer is controlled by controller 202 and may include an external control line 204 extending to an operators console 206. The control line 204 interacts with a key pad 208 used by an operator at console 206 to control the output of a signal from the reproducer on video line 210 which is connected to a character generator 212. The composite video frames from the video reproducer and alpha numeric character derived from encoded inputs, the audio output signal from the reproducer 200 is fed by line 214 to a speaker assembly 216 at the operators console 206 to allow monitoring of the audio. The character generator 212, for this purpose, receives an input signal by line 218 from an address and mode selector 220 situated at the operators console 206 and coupled to a key pad 208 to allow operator control of the reproducer 200, the character generator 212, and a memory card reader 222. Reader 222 is controlled by a signal in line 224 from the mode selector 220 to produce an output signal in line 226 in response to interchangeable plug-in cards containing read only programming. The output signal appearing on line 218 from the output from the address and mode selector 220 is a supervisory program signal and, as provided by key pad 208, a supervisor alert signal. These supervisory program and alert signals are combined with the broadcast signals appearing on video line 210 for transmission throughout the facility. The control exercised by the address and mode selector 220 over character generator 212 yields an output in a video line 228 for distribution to each of a plurality of monitors 230A, 230B . . . 230N. The video monitors display the video on line 228 which is composite of the video produced by the character generator 212 and video reproducer 200.

The system is utilizing the features of video communication with an audio that allows special announcements to be played, all speaker boxes will be remotely controlled in response to a tone that is recorded on the recording prior to the announcement. After the announcement all speaker boxes can either return the audio level they were set to by the rider or remain on, as selected by the system user. The communication system using antenna 234 is also useful to receive a signal emitted from a designated responding station, in response to a RF signal sent from the transit vehicle, and according to either of the systems shown in FIGS. 9 or 10, the RF signal in turn will be supplied by a coupler 236 to a receiver 240 for decoding and supplying a corresponding signal to address and mode selector and thereby distribution throughout the system for display by way of the character generator as a video insert or an announcement in the audio system.

In FIGS. 5–8 there is shown a broadcast system in which both video and audio signals are dispersed by a common bus to discrete monitors for persons throughout the facility. A video display generated by a character generator, as previously described and a decoded audio signal also previously described could serve as the video and audio signals for this broadcast system. The transmitter circuit 300 shown in FIG. 5 incorporates many of the component parts found in the transmitter 10 shown in FIG. 1. The circuit 300 produces a composite of audio, video and power appearing on bus 302 for distribution throughout the facility to individual monitors 304A, 304B . . . 304N (FIG. 8) for the powering of each monitor for broadcasting the audio and video signals. A video/audio reproducer 306, the same as video/audio reproducer 200 of FIG. 4, is provided to recover a video and audio signal for use in the facility. The video/audio reproducer 306, as shown, includes input terminals 306A and 306B for receiving video and audio input signals, respectively, from any of diverse sources. The derivation of the audio portion of the signal applied to bus line 302 is in response to the control functions of a microcontroller 316. The microcontroller receives a plurality of input control signals which include a signal appearing on line 318 from a programming card 320 and/or a signal appearing on line 322 from a barcode reader 324 and/or a signal appearing on line 326 as the output of switches 328 under local control by an operator suitably situated at a control console for the mass transit vehicle. The outputs from programming card 320, bar code reader 324 and local control switches 328 all form programming signals for the microcontroller 316.

The microcontroller is connected by a line 360 which exercises control of an audio/video reproducer 306 whose output, as a result thereof, is an audio/video signal of which the audio portion appears on line 332 supplied to a switched line 366 in an audio mixer 334. The audio signals applied to audio mixer 334 include the audio output from an audio recorder/audio reproducer 336 and an executive control signal appearing in line 338 as the output of an audio mixer 340. The audio mixer 340 has two input lines, one input line 342 extends to a tone generator 344 which is triggered to generate a tone alert signal in response to a signal appearing on line 346 which is an output control function of the microcontroller 316 responsive to a signal appearing on line 348 as an output signal of a switch 350 comprising a component of an announcement microphone 352. Switch 350 is preferably a "push to talk" switch so that when the switch is depressed an activation signal appears on line 348 for energizing the tone generator 344. An audio signal appears at the output of the microphone transducer forming part of the announcement microphone 352 is applied to an audio amplifier 354 whose output on line 356 forms the second input to audio mixer 340. Thus, audio mixer 340 will receive initially a tone generator signal triggered by the "press to talk" switch and thereafter an audio signal via the microphone transducer and audio amplifier 354. These sequentially occurring signals fed to the audio mixer 340 are applied by line 338 to audio mixer 334 and by a line 358. These signals become a control basis for the operation of an audio recorder/reproducer 336. The audio recorder/reproducer 336 is inhibited when a signal appears at the in line 358 and in the absence of the signal by line 358, audio recorder/reproducer responds to controls provided by an output in line 330 from microcontroller 316. A feedback line 362 provides status information of the audio recorder/reproducer 336 to the microcontroller 316. The microcontroller 316 has an output applied by line 366 to audio mixer 334. The output of audio mixer 334 is applied by line 368 to a video and audio modulator/power multiplexer 372 for modulating the audio appearing on line 368 and the video signals appearing on line 395 onto a carrier and multiplexing the modulated signal with a power supply appearing on line 370 as the output of a power supply 371.

Figure 6:
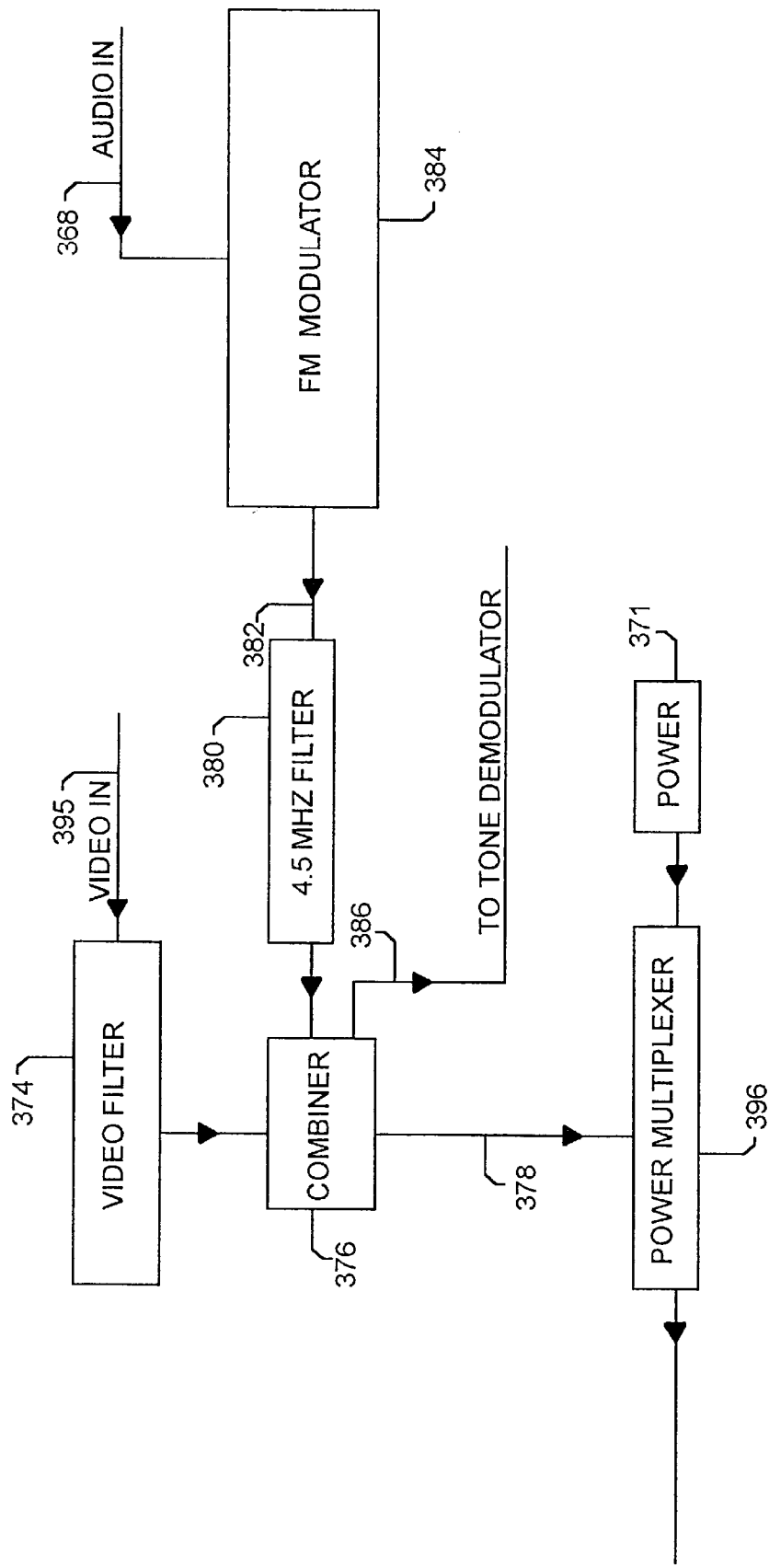
FIG. 6 is a block diagram of circuitry for combining audio, video and a power supply for distribution using a conductor bus in the system of FIG. 5.

An example of the circuitry suitable to form the video and audio modulation and power multiplexing is shown in FIG. 6. The input video by line 395 is fed to a video filter 374 whose output is applied to a combiner 376. The video filter 374 has a relatively sharp cut off after 4.5 MHZ to prevent any video over modulation from interfering with the audio portion of information that is to also be modulated on to the carrier. The combiner adds a 4.5 MHZ sub-carrier to the video to form a modulated output in line 378. The output of a FM modulator 384 which uses a 4.5 MHZ sub-carrier oscillator with a varactor diode input to modulate an audio input appearing on line 368 to produce the desired FM modulated output at line 382 and filtered at the 4.5 MHZ filter 380. The combiner 376 is used to supply a feedback signal such as a modulated tone in line 386 that is applied as an input to an audio demodulator/demultiplexer 388 and in turn connected to a tone decoder 389 for the recovery of a signal that is locally generated at any of the monitoring stations. The decoded signal is applied by line 392 to a call display 394 and may be an alarm signal that a rider desires to exit the bus at the next desired stop.

Figure 7:
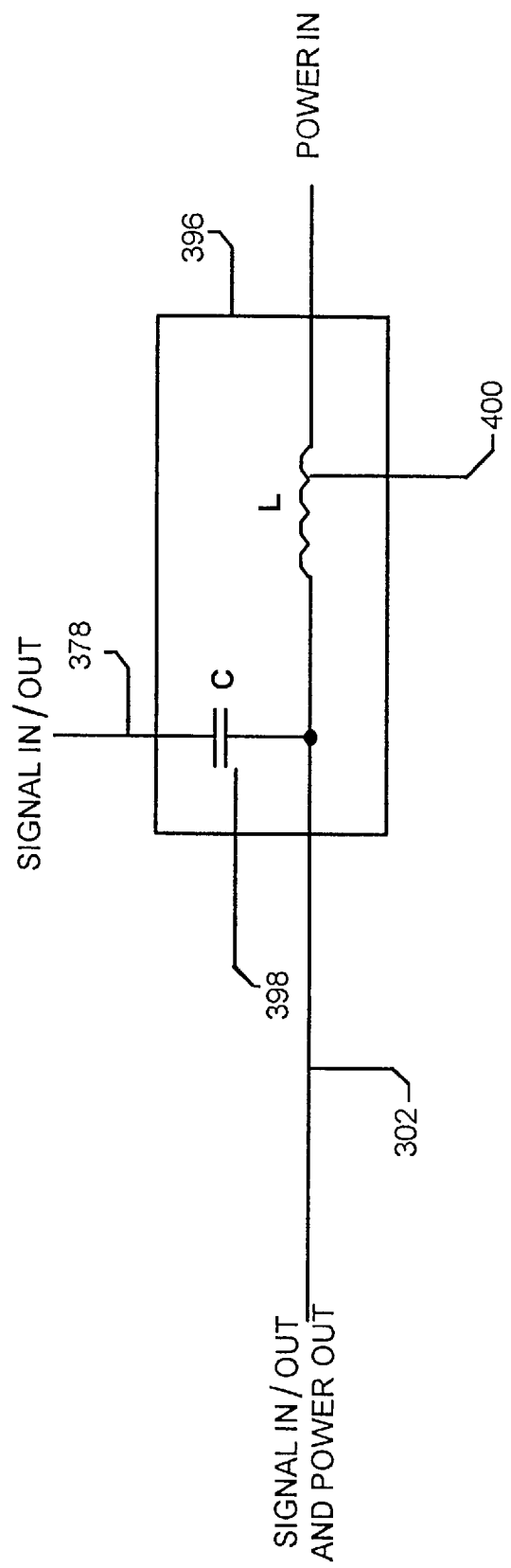
FIG. 7 is an electrical diagram to illustrate a multiplexing of power and broadcast signals for a co-axial type cable distribution system.

Returning again to FIG. 6, the modulated output appearing on line 378 is applied to a power multiplexer 396 having an input connected to receive DC power from supply 371. Multiplexer 396 forms an output appearing on bus 302 that can be communicated throughout the facility by a co-axial cable, for example, to supply the video with a 4.5 MHZ aural sub-carrier and power. FIG. 7 illustrates a simplified form of the power multiplexer 396 in which the combined input in line 378 is applied to a capacitor 398 used to block the DC voltage from the combiner 376. An inductor 400 serially connected in the power line with the output side of the capacitor prevents the video and 4.5 MHZ sub-carrier from feeding into the power supply 371. In this way, the output signal fed to the coaxial cable will have the video, 4.5 MHZ sub-carrier and the DC power impressed on it. In this way, transmission of audio, video and DC power over the same wires forming the bus 302.

Figure 8:
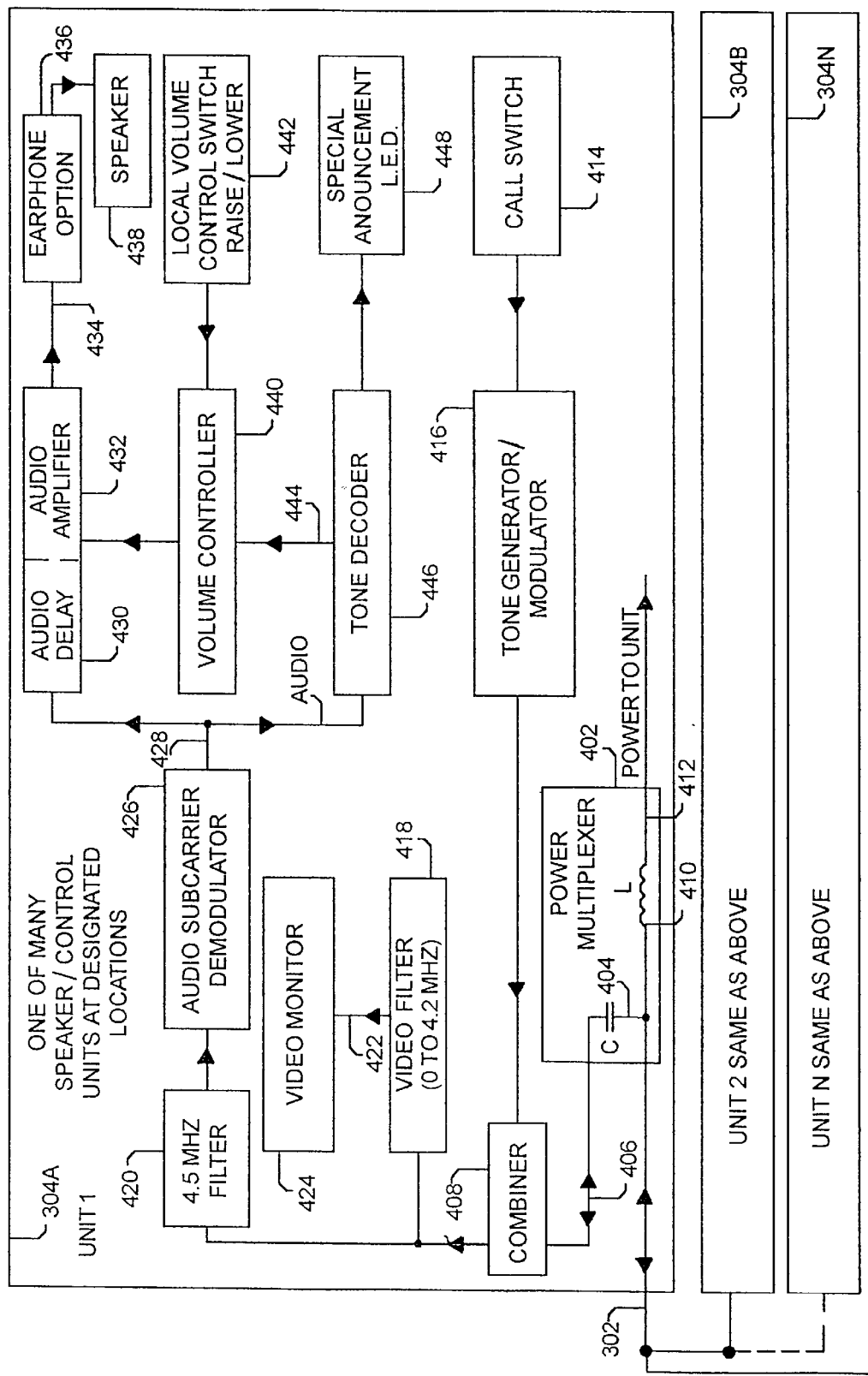
FIG. 8 is a block diagram illustrating the components of monitors for recovering the audio and video broadcast signals in the broadcast system of FIG. 5.

FIG. 8 illustrates the circuitry for one of the plurality of monitoring stations 304A, 304B . . . 304N. The monitoring stations are identically constructed and include circuitry that is essentially the reverse of modulating/multiplexing functions to produce the composite signal distributed by bus 302. The signal in bus 302 is applied to a power multiplexer 402 wherein a capacitor 404 blocks the DC power but passes the video and aural signals to line 406 forming an input to a combiner 408. An inductor 410 recovers DC power which is distributed by line 412 to the components of the monitor for fulfilling their power requirements for stand along operation. The combiner 408 provides a feedback path to the transmitter by which a call signal produced by call switch 414 is applied to a tone generator/modulator 416 so that the modulated tone signal can be transmitted through the combiner 408 to the bus 302 for recovery at the transmitter as described hereinbefore. The output of combiner 408 is applied to a video filter 418 and an audio filter 420. The video filter applies a modulated signal in a band up to 4.2 MHZ for recovery of the video portion of the signal which is applied by line 422 to a video monitor 424. Filter 420 applies the recovered signal to an audio sub-carrier demodulator 426 which recovers the audio portion of the transmitted signal that is applied by output line 428 connected through an audio delay circuit 430 in an audio amplifier 432. The amplifier applies an output signal to line 434 having an optional earphone jack 436 and a speaker 438. Amplifier 432 is driven in response to the volume controller 440 which is responsive to a local volume control switch 442 and an executive output signal generated within the volume controller 440 in response to a signal appearing on line 444 comprising the output of a tone decoder 446 having an input connected to the audio signal on output line 428. The volume controller when responding to the signal on line 444 establishes a predetermined volume level for the operation of an audio amplifier 432 which forms an executive volume control that follows preempting of programmed material by an executive tone alert signal which is the decoded output of tone decoder 446. When triggered, the output from the tone decoder 446 is applied to a signaling device such as an announcement LED 448 visible from the face of the monitoring station. A resident power supply is formed by a power supply output line 412 extending from the audio/power demultiplexer/demodulator 402. Power supply line 412 delivers the necessary operating current through audio amplifier 432, volume controller 440, local volume control 442, the announcement LED 448, tone decoder 446 and to a tone generator 416.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. A system for operating a tag for identifying a responding location from a calling location, said system including the combination of:

a transmitter at such a calling location for producing a radio frequency signal having power pulses of predetermined durations at such calling location; and a tag at a responding location including:

a first receiver at such responding location responsive to said power pulses of the radio frequency signal for passively generating alternating current voltage pulses;

a detector energized by each of said voltage pulses for generating a voltage regulator disabling signal for substantially the duration of each of said power pulses;

a rectifier responsive to said voltage pulses for forming a tag transmitter power supply;

an encoder powered by said tag transmitter power supply for generating a preset digital code identifying such responding location;

a tag transmitter receiving said preset digital code for broadcasting an encoded radio frequency signal; and a voltage regulator disabled by said voltage regulator disabling signal and enabled by the absence thereof supplying an operating voltage from said tag transmitter power supply to said encoding means and said tag transmitter; and said calling location further including:

a second receiver responsive to said encoded radio frequency signal for receiving and decoding said encoded radio frequency signal.

2. The system of claim 1, wherein said calling location transmitted signal is a high power continuous wave pulse.

3. The system of claim 1, wherein said first receiving means includes an antenna and a filter.

4. The system of claim 1, wherein said first receiver includes an impedance matching means for matching the frequency of response by said second receiver to said radio frequency signal.

5. The system of claim 1, wherein said detector includes a diode and a capacitor.

6. The system of claim 1, wherein said rectifier includes a diode and a capacitor.

7. The system of claim 1, wherein said detector includes a first diode and a first capacitor and said rectifying includes a second diode and a second capacitor.

8. The system of claim 7, wherein the capacitance of said second capacitor greatly exceeds the capacitance of said first capacitor, and wherein said first capacitor and said second capacitor are each protected form an over voltage by individual diodes.

9. The system of claim 1, wherein said second receiver responsive to said encoded radio frequency signal is located at such calling location.

10. The system of claim 1, wherein said second receiver responsive to said encoded radio frequency signal is located at a data receiving location distinct from said calling location.

11. The system of claim 9, wherein such calling location comprises a mass transit vehicle.

12. The system of claim 11, wherein said encoded radio frequency signal is decoded for a broadcast signal in said mass transit vehicle.

13. A system for operating a tag for identifying a responding location from a calling location, said system including the combination of:

a transmitter at such a calling location for producing a radio frequency signal having power pulses of predetermined durations at such calling location; and a tag at a responding location including:

a first receiver at such responding location responsive to said power pulses of the radio frequency signal for passively generating an alternating current voltage pulses;

a rectifier connected to charge a current storage member responsive to said voltage pulses for forming a tag transmitter power supply;

an encoder powered by said tag transmitter power supply for generating a preset digital code identifying such responding location;

a tag transmitter receiving said preset digital code for broadcasting an encoded radio frequency signal; and a voltage regulator preventing the supply of an operating voltage from said tag transmitter power supply to said encoding means and said tag transmitter for substantially the duration of the period of each of said voltage bursts, said voltage regulator being operative after each such period of voltage bursts in response to a predetermined voltage established by said rectifier; and said calling location further including:

a second receiver responsive to said encoded radio frequency signal for receiving and decoding said encoded radio frequency signal.

14. The system of claim 13, further including a detector diode and capacitor for generating a shut down signal to said regulator to prevent said regulator from operating until said predetermined voltage is established by said receifier.

15. The system of claim 13, further including a voltage comparator for monitoring said tag transmitter power supply of said rectifier, said voltage comparator activating said regulator when said predetermined voltage is established by said rectifier.

16. The system of claim 15, wherein said voltage regulator includes said voltage comparator.

17. The system of claim 15, wherein said rectifier includes a capacitor.

18. The system of claim 13, wherein said calling location transmitted signal is a high power continuous wave pulse.

19. The system of claim 13, wherein said first receiver includes an antenna and a filter.

20. The system of claim 13, wherein said first receiver includes an impedance matching means for matching the frequency of response by said first receiver to said radio frequency signal.

21. The system of claim 13, wherein said second receiver responsive to said encoded radio frequency signal is located at such calling location.

22. The system of claim 13, wherein said second receiver responsive to said encoded radio frequency signal is located at a data receiving location distinct from said calling location.

23. The system of claim 21, wherein such calling location comprises a mass transit vehicle.

24. The system of claim 23, wherein said encoded radio frequency signal is decoded for a broadcast signal in said mass transit vehicle.

* * * * *